US007555318B2

(12) United States Patent
Seshadri et al.

(10) Patent No.: US 7,555,318 B2
(45) Date of Patent: *Jun. 30, 2009

(54) HANDOVER OF CALL SERVICED BY MODULAR EAR-PIECE/MICROPHONE BETWEEN SERVICING BASE PORTIONS

(75) Inventors: Nambirajan Seshadri, Irvine, CA (US); James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 11/122,146

(22) Filed: May 4, 2005

(65) Prior Publication Data
US 2006/0183425 A1    Aug. 17, 2006

Related U.S. Application Data

(60) Provisional application No. 60/653,234, filed on Feb. 15, 2005.

(51) Int. Cl.
*H04M 1/00*    (2006.01)
(52) U.S. Cl. .............. 455/569.1; 455/575.2; 455/575.6; 455/436; 455/556.1; 455/557; 379/430; 379/433.01; 370/331
(58) Field of Classification Search ............ 455/41.2, 455/41.3, 556.1, 556.2, 557, 575.2, 569.1, 455/575.6, 550.1, 344, 563, 436; 379/430, 379/106.02
See application file for complete search history.

(56) References Cited

U.S. PATENT DOCUMENTS

| 5,790,952 | A | * | 8/1998 | Seazholtz et al. | 455/432.1 |
| 5,913,163 | A | * | 6/1999 | Johansson | 455/426.1 |
| 5,966,667 | A | * | 10/1999 | Halloran et al. | 455/552.1 |

(Continued)

*Primary Examiner*—Marceau Milord
(74) *Attorney, Agent, or Firm*—Garlick Harrison & Markison; Bruce E. Garlick; Shyne X. Short

(57) ABSTRACT

Handover of call serviced by modular ear-pience/microphone between servicing base portions is presented. A wireless headset includes wireless interface(s), earpiece, a microphone, processing module, and a user interface. The wireless interface(s) wirelessly couples the wireless headset to a base unit via a wireless personal area network (WPAN). The earpiece renders inbound portions of the service calls audible while the microphone is operable to produce the outbound portion of the call. Both the earpiece and microphone are communicatively coupled to the wireless interface(s). The processing module also coupled to the wireless interface(s) allows the wireless headset to initiate call functions between the wireless headset and a servicing network made available through the base unit, service a call and call control functions, and anchor the call to the wireless headset. The user interface in conjunction with the processing module allows the wireless headset to initiate commands and/or call control functions based upon user input.

37 Claims, 12 Drawing Sheets

U.S. PATENT DOCUMENTS

| | | | |
|---|---|---|---|
| 5,983,100 A * | 11/1999 | Johansson et al. | 455/426.1 |
| 6,112,103 A * | 8/2000 | Puthuff | 455/557 |
| 6,223,029 B1 * | 4/2001 | Stenman et al. | 455/420 |
| 6,430,395 B2 * | 8/2002 | Arazi et al. | 455/41.2 |
| 6,714,233 B2 * | 3/2004 | Chihara et al. | 348/14.02 |
| 6,885,848 B2 * | 4/2005 | Lee | 455/41.2 |
| 7,010,288 B2 * | 3/2006 | Brown et al. | 455/412.1 |
| 7,107,010 B2 * | 9/2006 | Heinonen et al. | 455/41.2 |
| 7,107,057 B2 * | 9/2006 | Arazi et al. | 455/443 |
| 7,146,191 B2 * | 12/2006 | Kerner et al. | 455/558 |
| 7,174,130 B2 * | 2/2007 | Kurisko et al. | 455/41.2 |
| 7,194,257 B2 * | 3/2007 | House et al. | 455/418 |
| 7,231,212 B2 * | 6/2007 | Arazi et al. | 455/436 |
| 7,233,808 B2 * | 6/2007 | Mooney et al. | 455/557 |
| 7,236,470 B1 * | 6/2007 | Bims | 370/328 |
| 7,243,851 B2 * | 7/2007 | Zhu et al. | 235/472.02 |
| 7,257,372 B2 * | 8/2007 | Kaltenbach et al. | 455/41.2 |
| 7,409,234 B2 * | 8/2008 | Glezerman | 455/569.1 |
| 7,486,965 B1 * | 2/2009 | Hollister | 455/553.1 |
| 2005/0026560 A1 * | 2/2005 | Villaverde et al. | 455/3.06 |

\* cited by examiner

HANDOVER OF CALL SERVICED BY MODULAR EAR-PIECE/MICROPHONE BETWEEN SERVICING BASE PORTIONS

CROSS REFERENCES TO RELATED APPLICATIONS

This application claims the benefit of priority to U.S. Provisional Patent Application No. 60/653,234 entitled "HANDOVER OF CALL SERVICED BY MODULAR EAR-PIECE/MICROPHONE BETWEEN SERVICING BASE PORTIONS," by Nambirajan Seshadri, et al. filed on Feb. 15, 2005, and is incorporated herein by reference in its entirety for all purposes. This Application is related to the following applications: application Ser. No. 10/981,418 entitled "UNIVERSAL WIRELESS MULTIMEDIA DEVICE," by Nambirajan Seshadri, et al., filed on Nov. 4, 2004, which is a continuation-in-part of application Ser. No. 10/856,430 entitled "PROVIDING A UNIVERSAL WIRELESS HEADSET," by Nambirajan Seshadri, et al., filed May 28, 2004 which claims priority under 35 USC § 119(e) to Provisional Application No. 60/473,967 filed on May 28, 2003; and application Ser. No. 10/981,418 is also a continuation-in-part of application Ser. No. 10/856,124 filed May 28, 2004 which claims priority under 35 USC § 119(e) to Provisional Application No. 60/473,675 filed May 28, 2003; application Ser. No. 10/976,300 entitled "MODULAR WIRELESS MULTIMEDIA DEVICE," by Nambirajan Seshadri, et al., filed on Oct. 27, 2004, which is a continuation-in-part of application Ser. No. 10/856,124 entitled "MODULAR WIRELESS HEADSET AND/OR HEADPHONES," filed May 28, 2004 which claims priority under 35 USC § 119(e) to Provisional Application No. 60/473,675, filed on May 28, 2003; and application Ser. No. 10/976,300 is also a continuation-in-part of application Ser. No. 10/856,430 filed May 28, 2004 which claims priority under 35 USC § 119(e) to Provisional Application No. 60/473,967 filed May 28, 2003; application Ser. No. 11/120,765 entitled "MODULAR EARPIECE/MICROPHONE THAT ANCHORS VOICE COMMUNICATIONS," by Nambirajan Seshadri, et al., filed on May 3, 2005, which claims priority under 35 USC § 119(e) to Provisional Application No. 60/656,828 filed on Feb. 25, 2005; application Ser. No. 11/122,146 entitled "HANDOVER OF CALL SERVICED BY MODULAR EARPIECE/MICROPHONE BETWEEN SERVICING BASE PORTIONS," by Nambirajan Seshadri, et al., filed on May 4, 2005, which claims priority under 35 USC § 119(e) to Provisional Application No. 60/653,234 filed on Feb. 15, 2005; application Ser. No. 11/120,900 entitled "MODULAR EARPIECE/MICROPHONE (HEADSET) OPERABLE TO SERVICE VOICE ACTIVATED COMMANDS," by Nambirajan Seshadri, et al., filed on May 3, 2005; application Ser. No. 11/120,903 entitled "BATTERY MANAGEMENT IN A MODULAR EARPIECE MICROPHONE COMBINATION," by Nambirajan Seshadri, et al., filed on May 3, 2005, which claims priority under 35 USC § 119(e) to Provisional Application No. 60/646,270 filed on Jan. 24, 2005; application Ser. No. 11/120,904 entitled "PAIRING MODULAR WIRELESS EARPIECE/MICROPHONE (HEADSET) TO A SERVICED BASE PORTION AND SUBSEQUENT ACCESS THERETO," by Nambirajan Seshadri, et al., filed on May 3, 2005, which claims priority under 35 USC § 119(e) to Provisional Application No. 60/646,437 filed on Jan. 24, 2005; application Ser. No. 11/120,902 entitled "MANAGING ACCESS OF MODULAR WIRELESS EARPIECE/MICROPHONE (HEADSET) TO PUBLIC/PRIVATE SERVICING BASE STATION," by Nambirajan Seshadri, et al., filed on May 3, 2005, which claims priority under 35 USC § 119(e) to Provisional Application No. 60/646,235 filed on Jan. 24, 2005; application Ser. No. 11/120,455 entitled "INTEGRATED AND DETACHABLE WIRELESS HEADSET ELEMENT FOR CELLULAR/MOBILE/PORTABLE PHONES AND AUDIO PLAYBACK DEVICES," by Josephus A. Van Engelen, et al., filed on May 3, 2005, which claims priority under 35 USC § 119(e) to Provisional Application No. 60/646,465 filed on Jan. 24, 2005, all of which are incorporated herein by reference in their entirety for all purposes.

BACKGROUND OF THE INVENTION

1. Field of the Invention

This invention generally relates to wireless communications and more particularly to a modular wireless multimedia device operable to support enhanced call functions.

2. Background of the Invention

Wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such devices enable these wireless communications. Such wireless communications have been extended to personal wireless networks, such as these defined by the Bluetooth specification. Not only have cellular telephones become very popular, but Wireless Local Area Networking (WLAN) devices have also proliferated. One standard for wireless networking, which has been widely accepted, is the Specification of the Bluetooth System, v. 1.0 ("Bluetooth Specification").

The Bluetooth Specification enables the creation of small personal area networks (PAN'S) where the typical operating range of a device is 10 meters or less, or sometimes up to 100 meters under ideal conditions. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices supports voice communication, the voice communications must be wirelessly supported in a continuous fashion so that carried voice signals are of an acceptable quality. One popular use of personal wireless networks couples a wireless headset(s) with cellular telephone(s), personal computer(s), and laptop(s), etc. The Bluetooth Specification provides specific guidelines for providing such wireless headset functionality.

Bluetooth provides a headset profile that defines protocols and procedures for implementing a wireless headset to a device private network. Once configured, the headset functions as the device's audio input and output. As further defined by the Bluetooth Specification, the headset must be able to send AT (Attention) commands and receive resulting codes, such that the headset can initiate and terminate calls. The Bluetooth Specification also defines certain headset profile restrictions. These restrictions include an assumption that the ultimate headset is assumed to be the only use case active between the two devices. The transmission of audio is based on continuously variable slope delta (CVSD) modulation. The result is monophonic audio of a quality without perceived audio degradation. Only one audio connection at a time is supported between the headset and audio gateway. The audio gateway controls the synchronous connection orientated (SCO) link establishment and release. The headset directly connects and disconnects the internal audio stream upon SCO link establishment and release. Once the link is established, valid speech exists on the SCO link in both directions. The headset profile offers only basic inoperability such that the handling of multiple calls or enhanced call functions at the audio gateway is not supported. Another limitation relates to the manner which Bluetooth devices service only single channel audio communications. In most cases, the Bluetooth device is simply a replacement for a wired headset. Such a use of the Bluetooth device, while providing benefits in mobility of the user, provides little additional benefit over wired devices. Because other wireless solutions provide many of the benefits that current Bluetooth devices provide in servicing voice communications, the needs for the complexities of the Bluetooth Specification are questioned.

Thus, there is a need for improved operations by WLAN devices servicing audio or multimedia communications that provide additional user functionality and improved service quality.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
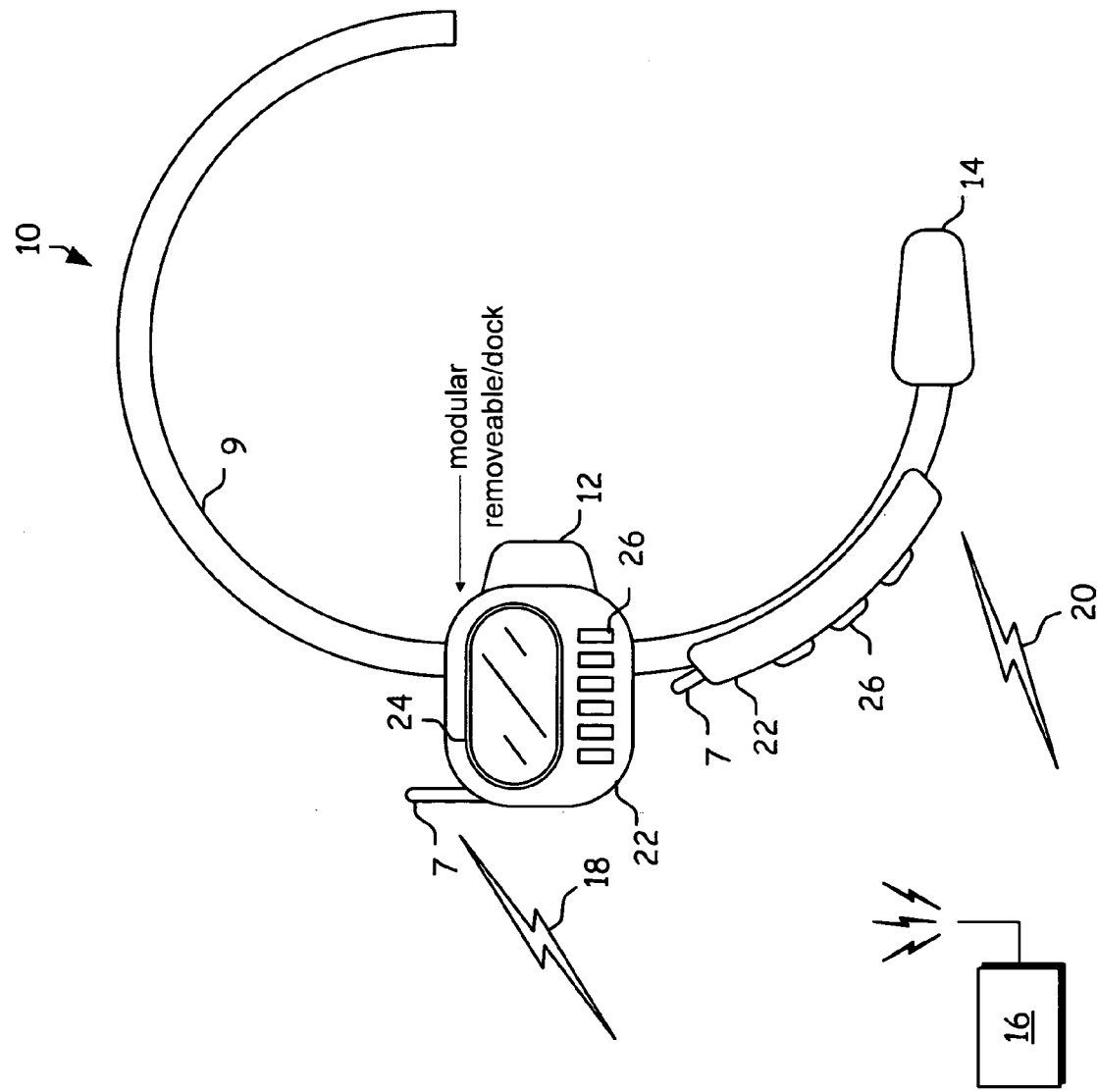
FIG. 1 is a diagram of a wireless headset in accordance with the present invention.

Embodiments of the present invention provide for the handover of calls or audio communications serviced by wireless headsets between servicing base station(s) that substantially addresses the identified needs, as well as other needs. One embodiment provides a method to service calls between the destination terminal accessed through a servicing network. This involves establishing a first wireless personal area network (WPAN) that communicatively couples a first base unit and a wireless headset. The WPAN then communicatively couples to the servicing network through the first base unit. This allows the servicing of calls with a first communication pathway between the destination terminal and the wireless headset via the communicatively coupled servicing network and first WPAN. Should the wireless headset detect the presence of a second base unit a second WPAN is established or may be established between the second base unit and wireless headset. The second WPAN communicatively couples to the servicing network through the second base unit. This allows a second communication pathway to be established between the destination terminal and the wireless headset via the operably coupled servicing network and second WPAN. The WPANs each depend on the establishment of trusted relationships between the headsets and servicing base station(s).

In another embodiment, the wireless headset supports all of the WPAN protocol stack and a number of upper layers of the servicing network protocol stack. The first base unit supports a number of lower layers of the servicing network protocol stack. The processing of the servicing network protocol stack is divided between the wireless headset and the first base unit. A subscriber or system identification module (SIM) within the wireless headset may support or provide for SIM functionality for the first base unit.

The wireless headset may detect a second base unit where the second base unit like the first base unit supports a number of lower layers of the servicing network protocol stack. The presence of a second base unit allows a second WPAN to be established wherein the second WPAN communicatively couples the second base unit and the wireless headset. This allows the establishment of a second communication pathway from the headset to the destination terminal through the second WPAN and the servicing network. Once this second communication pathway has been established it is possible for the wireless headset to initiate a handoff of a serviced call from the first communication pathway to the second communication pathway. When the call has been switched to the second communication pathway the servicing of the call via the second communication pathway continues and the first communication pathway may be terminated.

The host device may be operable to generate inbound RF signals from playback baseband signals (e.g., digital audio, video, text or data signals produced by a CD player, DVD player, et cetera). The host device provides the playback baseband signals to the appropriate modular device via a physical connection when the detachable earpiece is physically coupled to the host module. Alternatively, the host device may provide inbound RF signals to the detachable modules via a wireless communication resource when the detachable modular devices are not physically coupled to the host module. The modular communication device may further include a detachable microphone module, video play, text display, or intelligent whiteboard. The host module may receive audio record baseband signals via a physical connection from the microphone module when the microphone module is physically coupled to the host module. When the microphone module is not physically coupled to the host module, the detachable microphone module converts the audio record baseband signals into outbound RF signals and provides the outbound RF signals to the host module via wireless communication resource(s). The user interface in this case may initiate network functions, playback commands or record commands.

FIG. 1 is a diagram of a modular wireless headset 10 wirelessly coupled to host device 16 that includes earpiece 12 and microphone 14. Earpiece 12 may be a separate physical device from microphone 14. Accordingly, earpiece 12 and microphone 14 may be separate communication devices that individually communicate with host device 16 via separate communication pathways. As shown, earpiece 12 may communicate with host device 16, which may be a cellular telephone, wire line telephone, laptop computer, personal computer, personal digital assistant, etc., using transceiver (or receiver) 13 of FIG. 2 via a first communication pathway 18. Although shown as being external to earpiece 12, transceivers 13 and 15 may be integrated within earpiece 12 and microphone 14. Host device 16 is operable to establish a wireless pathway to earpiece 12 or microphone 14. The microphone 14 may communicate with the host device 16 using transceiver (or transmitter) 15 of FIG. 2 via a second communication pathway 20. Either or both earpiece 12 and microphone 14 may have a user interface 22. If the communication pathways are established in accordance with the Bluetooth specification, communication resources 18 and 20 may be different timeslot allocations on the same synchronous connection orientated (SCO) link, or may be separate SCO links.

User interface 22 allows a user to initiate enhanced call functions or network hardware operations. These enhanced call functions include call initiation operations, call conferencing operations, call forwarding operations, call hold operations, call muting operations, and call waiting operations. Additionally, user interface 22 allows the user to access network interface functions, hardware functions, base unit interface functions, directory functions, caller ID functions, voice activated commands, playback commands and device programming functions. User interface 22 can be any combinations of a visual interface as evidenced by display 24, tactile interface as evidenced by buttons 26, and/or an audio interface. Each of these devices, earpiece 12, microphone 14 and host device 16, may support one or more versions of the Bluetooth Specification or other wireless protocols. A Bluetooth "scatternet" is formed from multiple "piconets" with overlapping coverage A user of wireless headset 10 may establish communications with any available host device in a piconet. Wireless headset 10 may have a minimal user interface 22 where a single authenticate button 26 initiates joining of a piconet. Wireless headset 10 may reside within the service coverage area of each of multiple host devices. Thus, when wireless headset 10 enters (or powers up in) an area with more than one functioning piconets, a user may depress authenticate button 26, use a voice command or other means to start the authentication process. With the authenticate button depressed, the wireless headset attempts to establish a piconet with host device 16. Subsequent authentication operations are required to have the wireless headset join the selected piconet. These subsequent authentication operations may include prompting the user for selection of the piconet, requiring that an entry be previously made in an access list to allow wireless headset 10 to join the piconet, or other complete authentication operations. These operations may involve accessing information from memory within the headset. For example, SIM module information may be contained and used to authenticate with either or both the base unit and servicing network.

Once wireless multimedia device or headset 10 joins a respective piconet, wireless multimedia device or headset 10 establishes an audio link with the host device via respective WLAN links. Such calls will be received and managed by host device 16 or multimedia device or headset 10. Management duties for the calls may be divided between host device 15 and multimedia device or headset 10. Processing of the protocol may be divided between the headset and base unit. Integrated circuits in either headset 10 or host device 16 support the protocol stack.

Figure 2:
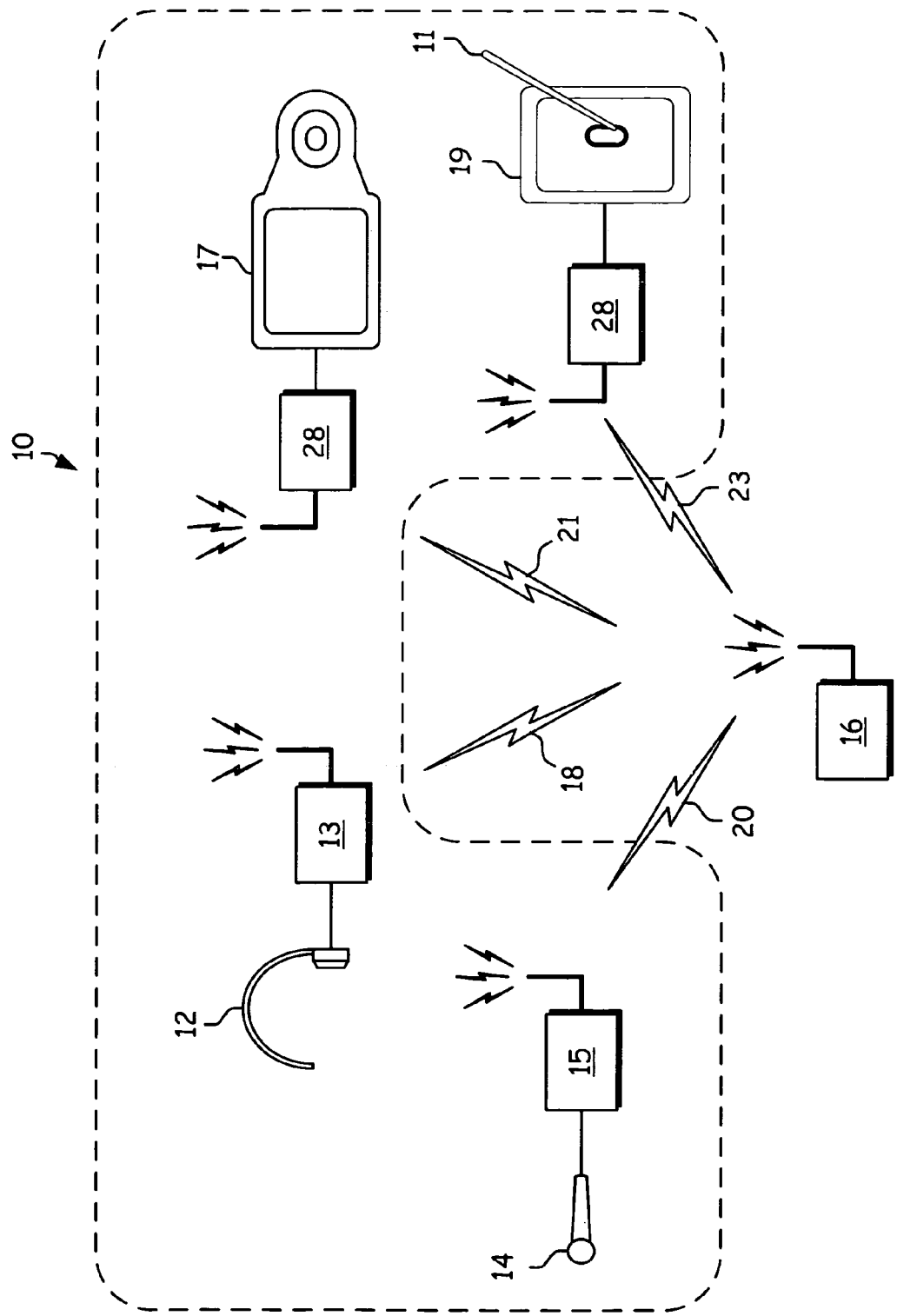
FIG. 2 is a diagram of another modular wireless multimedia device in accordance with the present invention.

FIG. 2 is a diagram of a modular wireless multimedia device that includes an earpiece 12, a microphone 14, display/camera 17, and a portable touch-screen/whiteboard 19. Microphone 14, earpiece 12, display/camera 17 and portable touch-screen/whiteboard 19 may each be a separate physical device. In one embodiment earpiece 12 is a separate device from microphone 14, that together function to provide the optionally modular wireless headset shown in FIG. 1. Accordingly, earpiece 12, microphone 14, display/camera 17, and a portable touch-screen/whiteboard 19 are separate communication devices that may individually communicate with host devices via separate or shared communication pathways. A single communication pathway using time division may be used to communicate between earpiece 12, microphone 14, display/camera 17, portable touch-screen/whiteboard 19 and host devices 30-37 or access point 21. This communication may be secured by encryption, validation, or other like methods known to those skilled in the art and may support one-way or two-way audio, video or text communications. One way communications allow the devices to act as receivers to broadcast information, while two-way communications allow real-time audio or video communications such as phone or radio communications which may be augmented with data and text to support interactive net meetings.

Figure 3:
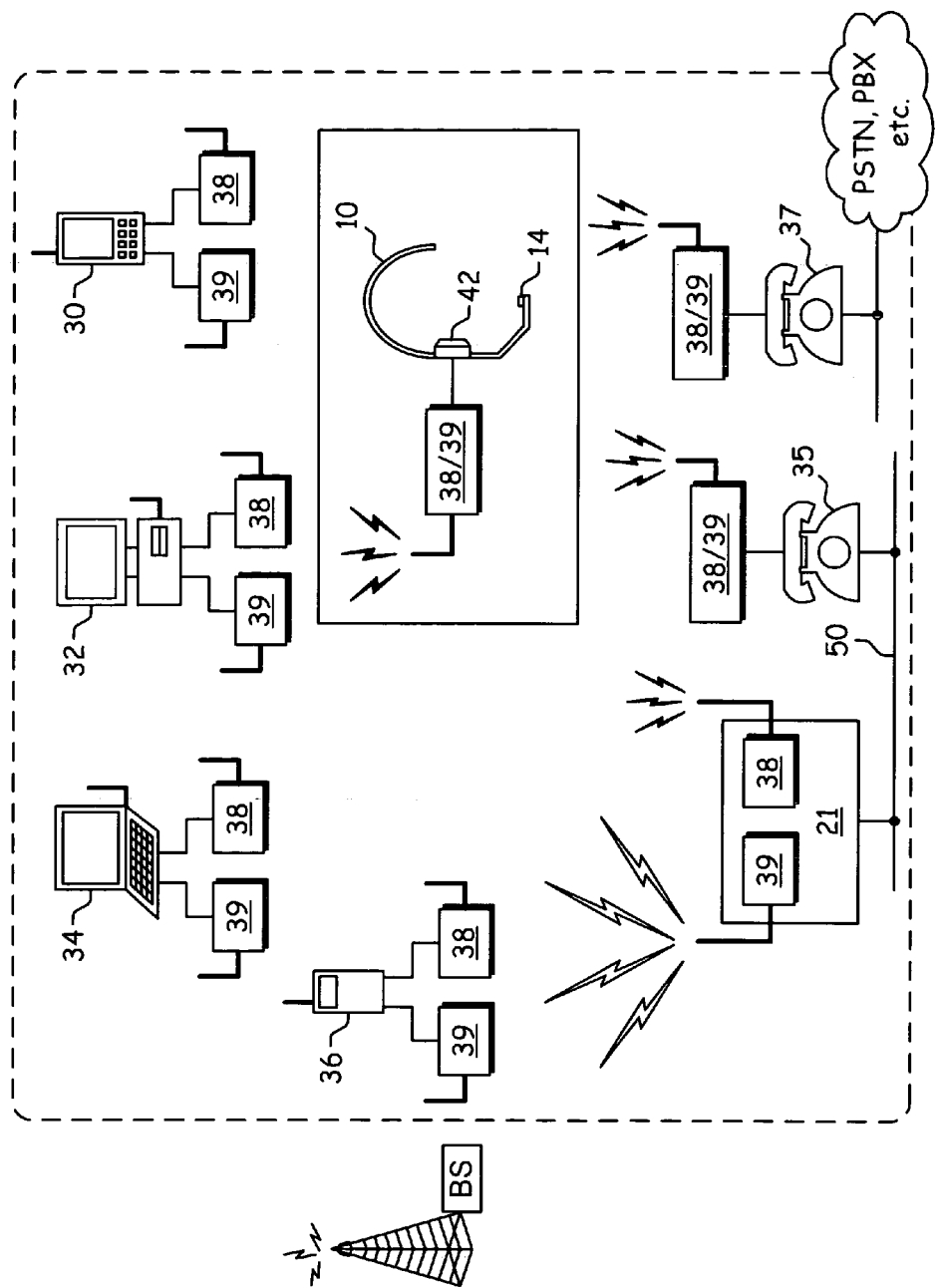
FIG. 3 is a diagram of a wireless multimedia device operable to couple to various host devices in accordance with the present invention.

Earpiece 12, once authorized or validated, may communicate with host device 16, which FIG. 3 depicts as a cellular telephone, wire line telephone, Ethernet telephone, laptop computer, personal computer, personal digital assistant, etc, using transceiver (or receiver) 13 via a first communication pathway 18. Host device 16 is operable to establish a wireless pathway to earpiece 12 or microphone 14. The microphone 14, once authorized or validated, may communicate with the host device 16 using transceiver (or transmitter) 15 via a second communication pathway 20. Display/camera 17 and portable touch-screen/whiteboard 19 may communicate with the host device 16 using transceivers (or transmitters) 25 and 27 via communication pathways 21 and 23, respectively. Communications between the headset may be handed off from a first host device 16 to a second host device as will be discussed in further detail with respect to FIGS. 11 and 12.

If the communication pathways are established in accordance with the Bluetooth specification, communication resources may be different timeslot allocations on the same synchronous connection orientated (SCO) link, or may be separate SCO links. These communication pathways may be secured by encryption, validation, pairing, or other like means to secure the communications exchanged with the host device. Validation or pairing may prevent unauthorized devices from communicatively coupling to the host device.

The quality of data provided to these devices may be adjusted according to which devices are actually present and supported. For example, audio quality can be improved and may even support stereo. This option may limit resources provided to microphone 14, display/camera 17, or whiteboard 19 to service multi-channel audio. Another example may favor the use of only earphone 12 and display/camera 17 to view streamed video and audio content. To coordinate the presentation of both audio and video in such an example, the earphone 12 and display/camera 17 and their received communications may be synchronized to provide a quality viewing experience. Similarly, to coordinate the presentation of multiple audio channels, earphones 12 may be synchronized in order to provide a quality experience. To coordinate the presentation of real-time two-way audio earphones 12 and microphone 14 may be synchronized such that unacceptable delays do not exist within exchanged voice communications. This coordination ensures there is no undue delay between the presentations provided by these individual devices allowing the user to perceive a seamless presentation. This embodiment allows the multimedia device to support net-meetings that require the delivery of complete Internet conferencing solutions with multi-point data conferencing, text chat, whiteboard, and file transfer, as well as point-to-point audio and video. Additionally, this allows the multimedia device to coordinate the presentation of these different media formats without necessarily requiring shared physical connections of these devices.

Direct connectivity previously limited the physical structure that could be used for a wireless headset or multimedia devices that supports net-meetings. In many cases, this results in headsets or multimedia devices that are cumbersome to use and uncomfortable to wear. The protocol used between host devices, access points and other communicatively coupled devices may allow the host device or access point to send data to each device in a coordinated manner that allows for the synchronized presentation of multimedia content by the devices. For example, one embodiment may allocate a predetermined portion of each data transmission for each media format. This would allow host device 16 to transmit the same data to each device, wherein each device only processes that content intended for that device. In another embodiment, host device or access point communicates in parallel with each device. By coordinating the data or packets exchanged with the devices, their individual presentations may be synchronized.

Earpiece 12 and microphone 14 may have on-chip operations to support call conferencing, call waiting, flash, and other features associated with telephones or net-meetings. These functions may me accessed and reviewed by a user interface and display within the host device or a user interface and display located on or coupled to either earphone 12 or microphone 14. The user interface and display, located on or coupled to either the host device or earphone 12 or microphone 14 may have a display and button(s) that may be used to program device, perform directory functions including selecting number to call, view caller ID, initiate call waiting, or initiate call conferencing. Additionally, circuitry within earphone 12 or microphone 14 may enable voice activated dialing. The actual voice recognition could be performed within earphone 12, microphone 14, or a host device. Thus, earphone 12 or microphone 14 may act to initiate calls and receive calls. A link between earphone 12 and microphone 14 would allow earphone 12 or microphone 14 to share resources, such as batter life, and allow earphone 12 or microphone 14 to be recharged from a host device.

Each of the devices 30-37 also includes piconet RF interface 38 and/or wireless interface 39. Piconet RF interface 38 may be constructed to support one or more versions of the Bluetooth specification. As such, each of the piconet RF interfaces 38-36 include a radio frequency transceiver that operates at 2.4 gigahertz and baseband processing for modulating and demodulating data that is transceived within a piconet. As such, universal wireless multimedia device 10 may be wirelessly coupled with any one of the devices 30-37 and act as the headset communicatively coupled to the devices 30-37.

Devices 30-37 may further include a wireless LAN (WLAN) RF interface 39. The wireless LAN RF interfaces 39 may be constructed in accordance with one or more versions of IEEE802.11 (a), (b), and/or (g) or other WLAN protocol known to those skilled in the art. Accordingly, each of the WLAN RF interfaces 39 include an RF transceiver that may operate in the 2.4 gigahertz range and/or in the 5.25 or 5.75 gigahertz range and further includes baseband processing to modulate and demodulate data that is transceived over the corresponding wireless communication link.

Contrasting the functionality of the piconet RF interfaces with the WLAN RF interfaces, the piconet RF interfaces allow point-to-point communication between the associated devices, while the WLAN RF interfaces enable the associated devices to communicate indirectly via access point 21. For example, via piconet RF interfaces 38 laptop 34 can communicate directly with cellular telephone 36. In contrast, via WLAN RF interfaces 39, laptop 34 communicates indirectly, via access point 21, with cellular telephone 36. In general, the coverage area of a piconet is significantly smaller than the coverage area of a WLAN. Thus, for example, if laptop 16 and cellular telephone 36 were unable to establish a piconet connection via piconet RF interfaces 38 due to distance between the devices, they would be able to establish a wireless communication link via the WLAN RF interfaces 39 and access point 21. Dual communication pathways would allow communications to be switched between these communication pathways, dependent on factors such as audio quality, signal strength, and available bandwidth.

Universal wireless multimedia device 10 may establish a piconet with any one of the devices 30-37 or with access point 21, which includes WLAN RF interface 40 and piconet RF interface 38. As such, universal wireless multimedia device 10 may function as the headset for wire line telephone 37, Ethernet telephone 35, personal digital assistant 30, personal computer 32, laptop computer 34 and/or cellular telephone 36 provided a piconet can be established with the device. In accordance with the present invention, if a piconet cannot be established with the particular device, an extended network may be created utilizing the WLAN connectivity and at least one corresponding piconet.

For example, if a communication is to be processed via wire line telephone 14 (i.e., the host device for this example), but headset 10 is at a distance such that a piconet cannot be established between their piconet RF interfaces 26 and 28. However, headset 10 is in range to establish a piconet with cellular telephone 36, the piconet RF interfaces 36 and 28 of cellular telephone 36 and headset 10, respectively, would establish a piconet. With this piconet established, cellular telephone 36, via its WLAN RF interface 48, establishes a wireless connection with access point 21. Access point 21 then establishes a communication link with wire line telephone 14. Thus, a logical connection is established between universal wireless multimedia device 37 and wire line telephone 37 via cellular telephone 36 and access point 21. Note that wire line telephone 37 may be directly coupled to LAN connection 50 or coupled to a private branch exchange, which in turn is coupled to access point 21. Accordingly, within a wireless geographic area, the range of universal wireless multimedia device 10 may be extended utilizing the WLAN within the geographic area. As such, universal multimedia device or headset 10 extends the mobility of its user, extends the range of headset use and expands on headset functionality. Alternatively, universal wireless multimedia device 10 may establish a piconet with cell phone 36. This allows cell phone 36 to establish an alternate communication pathway for the communications serviced by wired phone 14. Then it is possible for the call serviced by telephone 37 or 35 to be "handed off" to cell phone 36.

Figure 4:
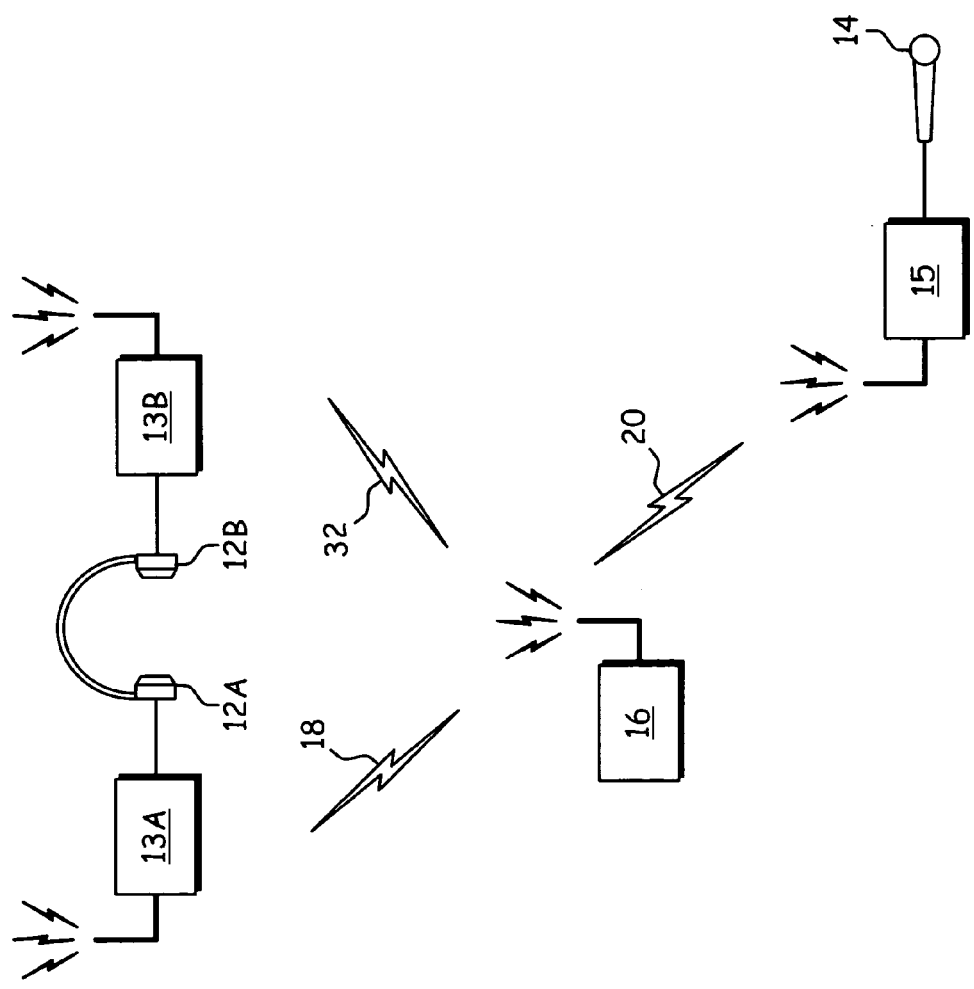
FIG. 4 is a schematic block diagram of a multi-channel wireless headset in accordance with the present invention.

FIG. 4 is a diagram of another embodiment of a modular wireless headset 10 that includes two earpieces 12A and 12B, and microphone 14, and user interface 22. In this configuration, microphone 14 communicates with host device 16 via communication pathway 20, earpiece 12A communicates with host device 16 using transceiver (or receiver) 13A via communication pathway 18 and earpiece 12B communicates with host device 16 using transceiver (or receiver) 13B via communication pathway 32.

In operation, voice produced by the individual using microphone 14 is received via microphone 34 and converted into RF signals by circuitry within microphone 14. These RF signals are provided to host device 16 via communication pathway 20. Host device 16 includes a corresponding receiver antenna 34 and receiver module 36 to recapture the audio signals received via communication pathways 18, 20 and 32. In addition, host device 16 includes at least one transmitter 38 to transmit audio information to the earpiece(s) 12A and 12B. In one embodiment, host device 16 may transmit left channel stereo information to earpiece 12 and right channel stereo information to earpiece 12B.

Wireless headphone(s) may be realized by omitting microphone 14 and including either one or both of earpieces 12A and 12B. In this embodiment, host device may be a playback device such as a CD player, DVD player, cassette player, etc. operable to stream audio information. If the display of FIG. 2 is utilized as well, both streaming audio and video may be enjoyed by the user.

Figure 5:
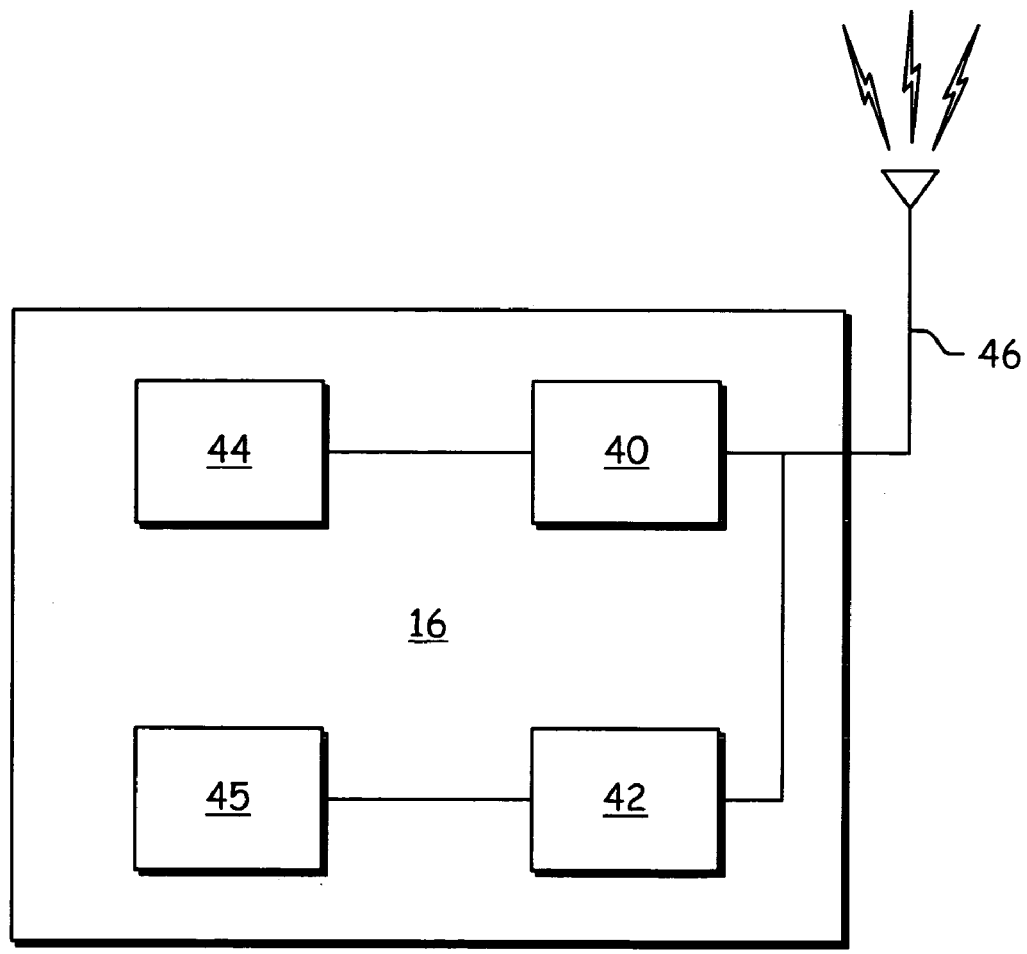
FIG. 5 is a schematic block diagram of an access point in accordance with the present invention.

FIG. 5 is a diagram of host device that supports modular wireless multimedia devices. Host device 16 includes a combination of transmitter and receiver (or transceiver) modules that accept and modulate or demodulate streamed audio, video, text, or data to and from earpiece(s) 12 and microphone 14, display 17 and whiteboard 19 through antenna 46. The host device may be incorporated within or operably couple to another device such as a playback device, laptop, cellular telephone, land based telephone or other like device known to those skilled in the art. For example, one embodiment has transmitter module 40 and receiver module 42. Transmitter module 40 accepts unmodulated streamed audio, video, data or text from playback type device 44 (e.g., DVD player, MP3 player, CD player, cassette player, or other like devices known to those skilled in the art). Playback device 44 may be integrated within host device 16. Transmitter module 40 then modulates the streamed audio into low intermediate frequency (IF) signal. In the case where two earpieces are employed, multiple transmitter modules or time separation may be employed to modulate the streamed audio into low IF signals for the earpieces for each channel (i.e. left and right channels of stereo transmissions. These multiple signals are synchronized in their presentation to a user. Similarly, receiver module 42 accepts modulated streamed audio, video, data or text from multimedia device 10. Receiver module 42 recovers signals from the received low IF signals. The recovered signals are then relayed to receiving presentation device 45. Note that the generation of low IF signals and subsequent demodulation to recapture audio signal may be done in accordance with a particular wireless communication standard. For example, the Bluetooth specification may be used, IEEE802.11 (a), (b), and/or (g) may also be used, etc. when host device 16 couples to a telephone network (PSTN, cellular, satellite, WLAN, VOIP, etc.). Host device 16 may receive data associated with the command as well. For example, caller ID information may be passed to user interface 22 or enhanced call operations may be initiated based on input received at the user interface.

Figure 6:
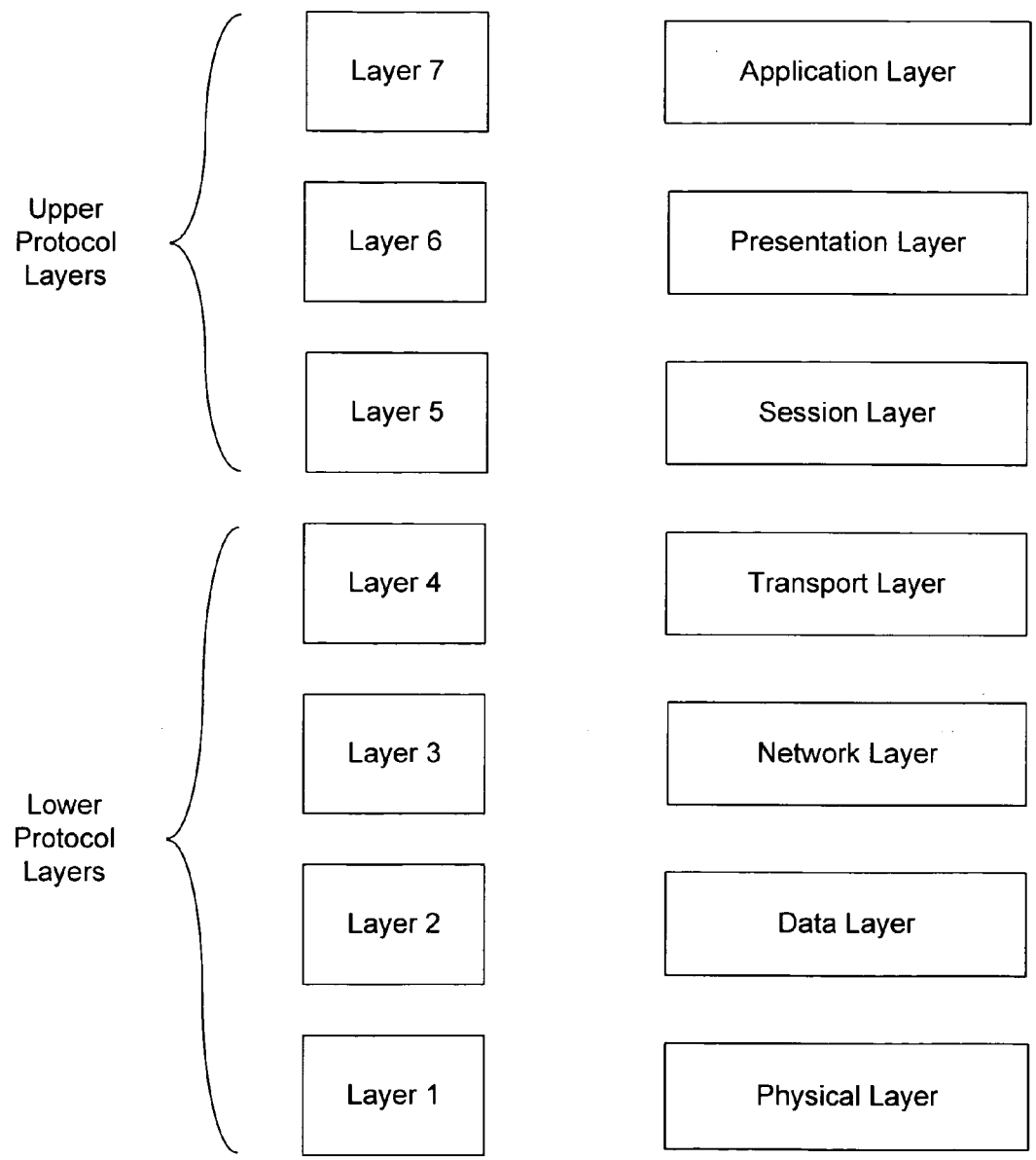
FIG. 6 is a graphic representation of a protocol stack and responsibilities associated with various layers within the protocol stack

FIG. 6 depicts various protocol layers within the open system interconnect (OSI) model. This protocol stack is a particular software implementation of computer networking protocol suites. The stack is often thought of the software implementation of the protocols. Individual protocols are designed with a single purpose in mind. This modularization makes design and evaluation easier. Within embodiments of the present invention, this modularization allows functionalities to be split between various components of the headset and host device or base station. The OSI model is divided into seven layers, with layers of 1 to 4 often being referred to as the lower layers, and layers 5 to 7 being referred to as the upper layers. The embodiments of the present invention may divide the processing and execution of the layers between different modules. For example, the upper layers, 5 through 7, may be executed within the headset 10, while the lower layers, 1 through 4, are processed within a base unit or host device. The base unit or host device may use SIM information supplied by the headset to establish connections over available networks.

As shown, layer one is the physical layer. Layer 1 defines the hardware implementation and electrical implementation of the bus, network cabling, connector type, pin out, physical data rates, etc. Examples of the physical layer specification include the RS232 and the RS422 specification. Data units at this layer are called bits. Layer 2 is the data layer. Different network and protocol characteristics are defined by different data-link layer specifications. The data-link layer is subdivided into the media access control (MAC) which controls accessing code data into valid signaling formats for the physical layer and the logical link control (LLC), which provides the link to the network layer. Here, the data units are called frames. Layer 3, the network layer, provides address assignments and packet forwarding methods. Data at this layer is often referred to as packets. Layer 4 is the transport layer, which provides transfer correctness, data recovery, and flow control, for example. TCP is a layer for protocol and the protocol data units are called segments in the transport layer. Again, layers 1 through 4 are often referred to as the lower protocol layers.

Layers 5, 6 and 7 are the upper protocol layers. Layer 5 is the session layer that is responsible for establishing communications sessions, security, and authentication. For example, NetBIOS is a layer 5 protocol. Protocol data units within the session layer are called data. Layer 6 is a presentation layer and determines how the device will represent the data. Again, data at this layer is referred to as data. Layer 7 is the application layer that allows user in the computer systems to generate and interpret data. Layer 7 also may provide for encryption and decryption. Applications using the network learn how to send a request, how to specify a filename, and how to respond to a request. Again, these upper layers may be performed by the headset, while the lower layers are performed by the base unit. In this case, the upper layers will also provide for the handoff between a base unit executing the lower protocol layers and a second base unit, also executing the lower protocol layers.

Figure 7:
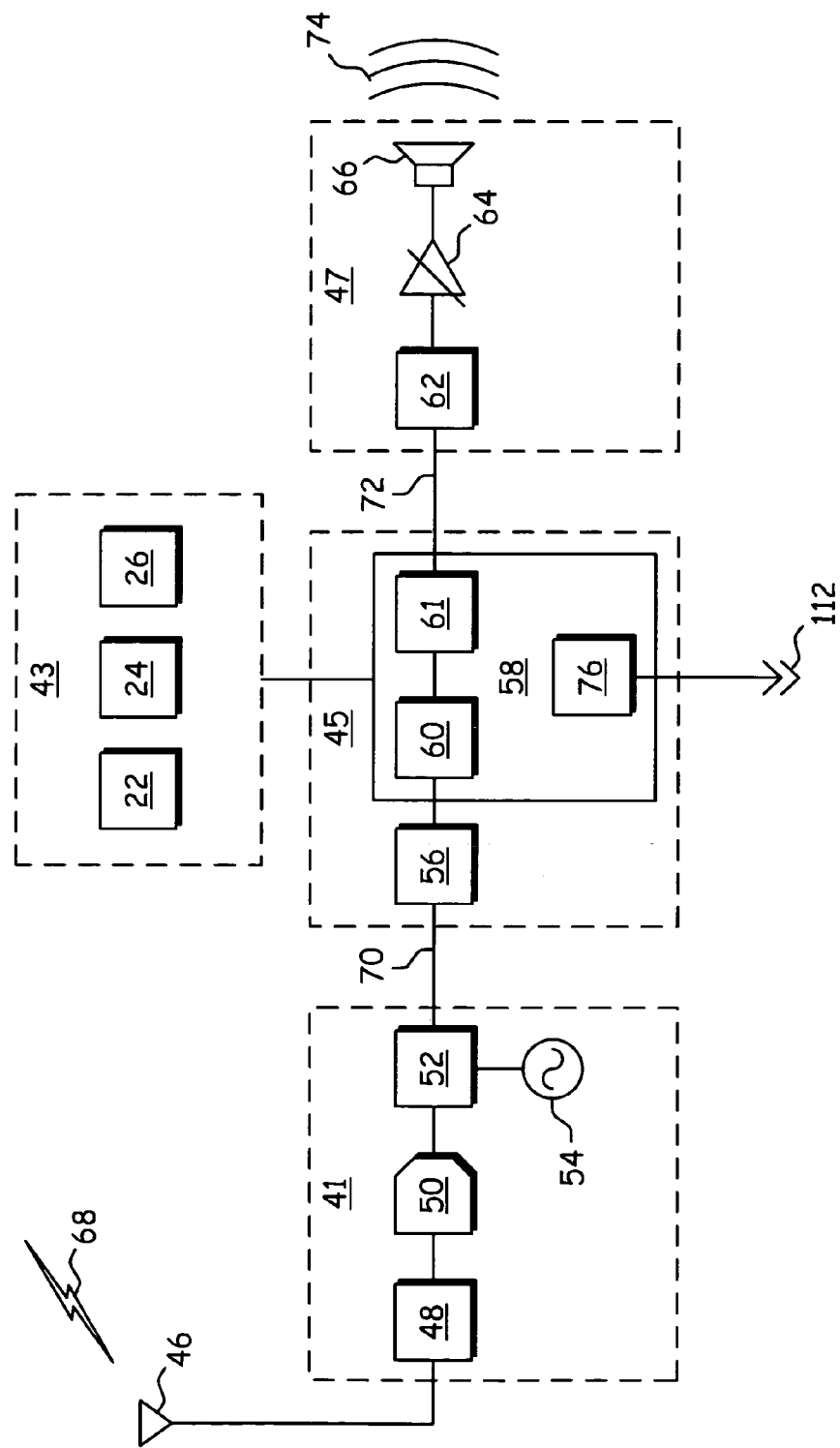
FIG. 7 is a schematic block diagram of wireless earpiece in accordance with the present invention.

FIG. 7 is a schematic block diagram of earpiece 12. Earpiece 12 includes receiver module 41, optional user interface 43, data recovery module 45 and speaker module 47. One embodiment of receiver module 40 includes antenna 46, bandpass filter 48, low noise amplifier 50, down converter 52 and local oscillator 54. User interface 43 can be any combinations of a visual interface as evidenced by display 22, tactile interface as evidenced by buttons 26, and/or an audio interface represented by microphone/speaker and may operably couple to processing module 58 to initiate enhanced call functions which will be described further in FIG. 11.

Data recovery module 45 may include an analog-to-digital converter (ADC) 56 and processing module 58. Processing module 58, which may have associated memory, is configured to provide digital channel filter 60, demodulator 61 and setup module 76. Additionally, processing module 58 may process the upper protocol layers. Speaker module 47 includes a digital-to-analog converter (DAC) 62, variable gain module 64, and at least one speaker 66.

Once the piconet is configured (which will be described subsequently), receiver module 41 receives inbound RF signal 68 from host device 16 via antenna 46. Bandpass filter 48 filters the received RF signal 68 which are subsequently amplified by low noise amplifier 50. Down converter 52 converts the filtered and gained RF signal 68 into low intermediate frequency (IF) signal 70 based on a local oscillator 54. Low IF signals 70 may have a carrier frequency at DC ranging to a few megahertz.

Data recovery module 45 receives low IF signals 70 and converts the low IF signals 70 into digital signals via ADC 56. Processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11 (a), (b), and/or (g) may also be used, etc.

Speaker module 47 converts digital audio signal 74 into analog signals provided to the user through speakers 66. Adjustable gain module 64 adjusts the gain (i.e., adjusts volume), and provides the gained signals to speaker 66, which produces audible signals 74. As long as the piconet remains in place between earpiece 12 and host device 16, earpiece 12 will produce audible signals 74 from received inbound RF signal 68.

Figure 8:
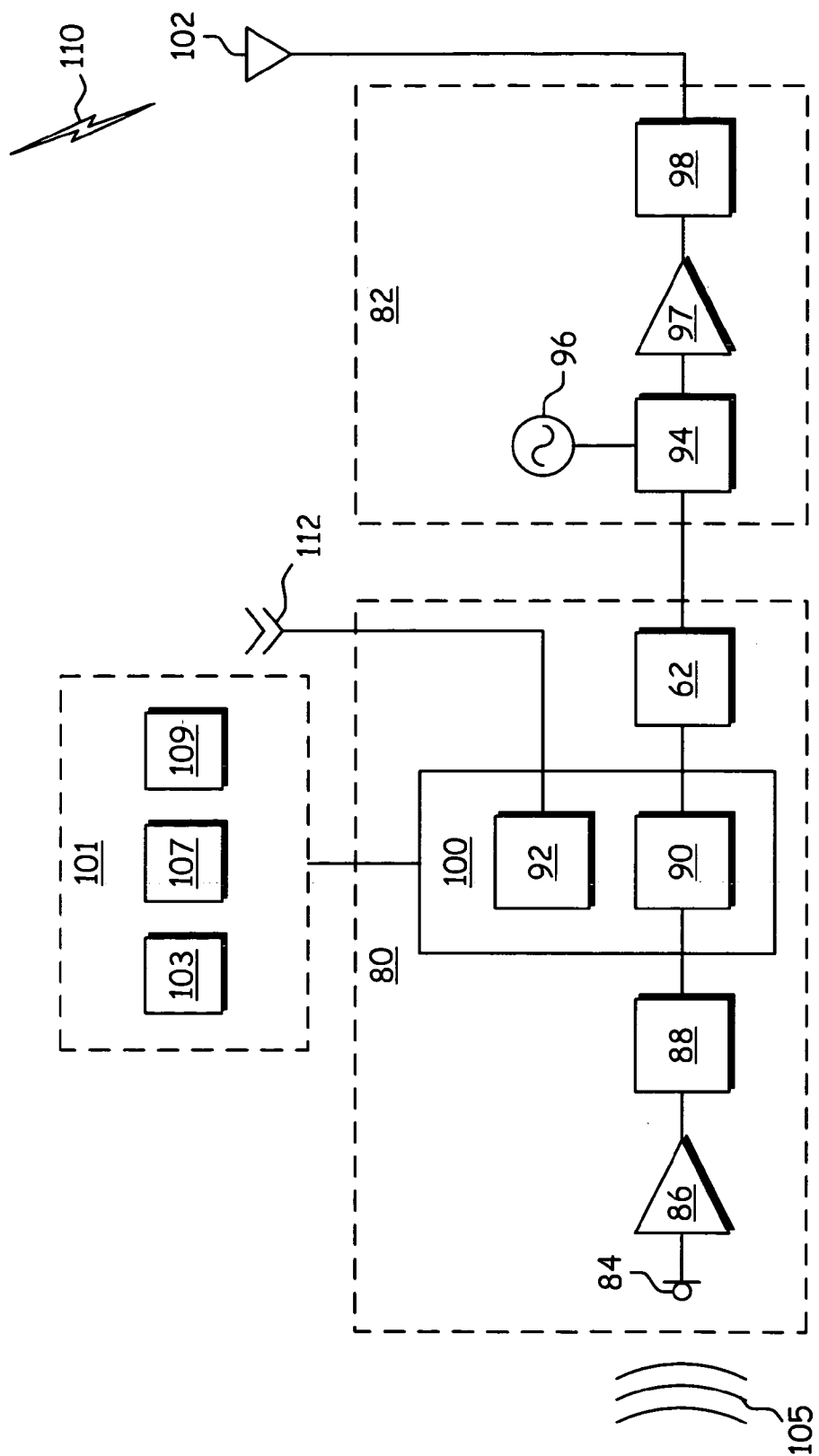
FIG. 8 is a schematic block diagram of a wireless microphone in accordance with the present invention.

FIG. 8 is a schematic block diagram of microphone 14 that includes audio input module 80, transmitter module 82 and user interface 101. Audio input module 80 includes microphone 84, amplifier 86, ADC 88, processing module 100 that is configured to provide a setup module 92 and modulator 90, and DAC 62. Additionally, processing module 100, like processing module 58, may handle all or a portion of the protocol stack. User interface 101 can be any combinations of a visual interface as evidenced by display 103, tactile interface as evidenced by buttons 107, and/or an audio interface represented by microphone/speaker 109 and may operably couple to processing module 100 to initiate enhanced call functions which will be described further in FIG. 10. Transmitter module 82 includes up-converter 94, local oscillator 96, power amplifier 97, bandpass filter 98, and antenna 102.

Once microphone 14 is configured within a piconet, microphone 84 is operably coupled to receive audio signals 105 and convert these signals to analog signals 106. Amplifier 86 amplifies analog audio signals 106 to produce amplified signals. ADC 88 then converts the amplified signals into digital audio signals 108. Modulator 90 modulates the digital signals based on a communication standard into modulated signals. As shown, modulator 90 and setup module 92 are implemented within processing module 100. Processing module 100 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently bandpass filter 98. The filtered RF signals are then transmitted via antenna 102 as outbound RF signals 110 to host device 16. As long as the piconet is established to include microphone 14 and host device 16, microphone 14 will transmit to host device 16 in the manner just described.

As shown in both FIGS. 7 and 8, separable connector 112 may couple setup modules 76 and 92. Such a physical connection allows for earpiece 12 and microphone 14 to communicate in both directions with the host device to establish the piconet. For example, if the devices are compliant with one or more versions of the Bluetooth Specification, host device 16, functioning as the master, may issue a piconet request to earpiece 12 coupled to microphone 14. Upon receiving this request, earpiece 12 and microphone 14 respond to the request indicating that a receive RF channel (communication pathway 18) be setup for the earpiece and a transmit RF channel (communication pathway 20) be setup for microphone 14. Based on these responses, the master coordinates the establishment of the piconet and provides synchronization information through earpiece 12 and microphone 14 via receiver module 40 of earpiece 12. Setup modules 76 and 92 coordinate the synchronization of earpiece 12 and microphone 14 with the host device, as well as coordinating timeslot assignments and/or SCO link assignments. Once the piconet has been established in this manner, the connection between earpiece 12 and microphone may be secured to establish the earpiece 12 and microphone 14 as separate pieces.

As an alternative setup mode, earpiece 12, microphone 14 may be directly coupled to the host device. The direct coupling may be used to establish the piconet and exchange synchronization information, timeslot allocation information, etc. Once the information has been exchanged in this manner, the connections may be broken such that earpiece 12, microphone 14 and host device 16 are physically separate devices.

Figure 9:
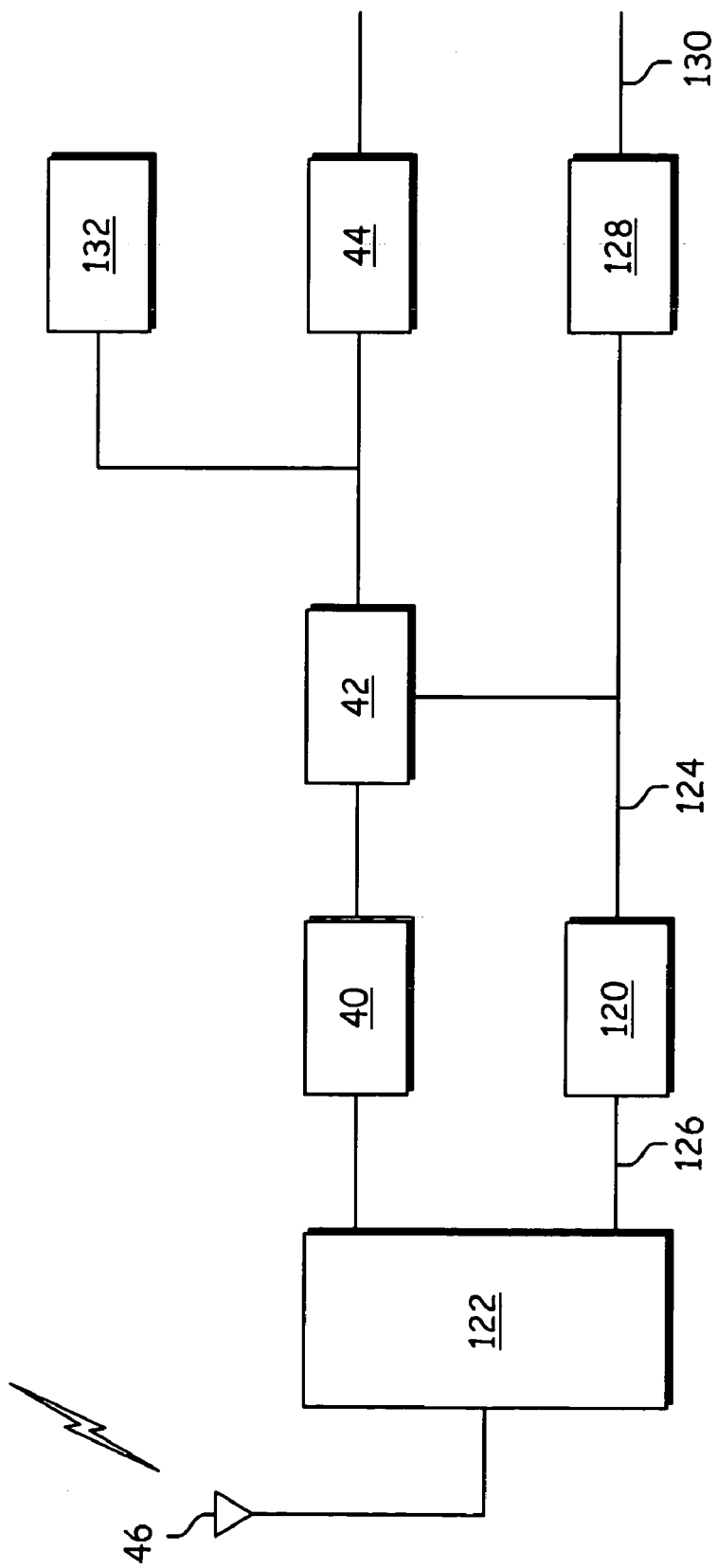
FIG. 9 is a schematic block diagram of a wireless earpiece in accordance with the present invention.

FIGS. 8 and 9 illustrate schematic block diagrams of earpiece 12 and microphone 14 that include transceiver modules (i.e., receiver modules and transmitter modules). The use of the transceiver modules allow earpiece 12, microphone 14 and host device 16 to be physically separate devices and be configured using the piconet's RF communications. As such, earpiece 12 and microphone 14 may be continuously worn on a person for receiving incoming calls and/or placing outgoing calls.

Earpiece 12, as shown in FIG. 9, includes antenna 46, transmit/receive switch 122, receiver module 41, data recovery module 45, speaker module 47, transmitter module 120, input module 128 and display module 132. Receiver module 41, data recovery module 45 and speaker module 47 operate as discussed with reference to FIG. 6. Data recovery module 45 may produce display information that is provided to display module 132. For instance, the received RF signal may include display information such as caller ID, command information, etc. which is separated by data recovery module 45 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

Data recovery module 45 receives digital command messages 124 and, when applicable, processes the command messages. For example, if the command message is with respect to a volume adjust; a graphical representation of adjusting the volume may be presented on display module 132 and the gain of amplifier 64 adjusted to adjust the volume associated with speaker 66.

Transmit module 120 receives digital command messages 124 and converts these messages into outbound RF command signals 126, which are subsequently transmitted to host device 16 and/or microphone module via antenna 46. Accordingly, by including transmitter module 120 along with receiver module 41, earpiece 12 may function as a master and/or slave within the piconet and exchange data with the other elements within the piconet.

Figure 10:
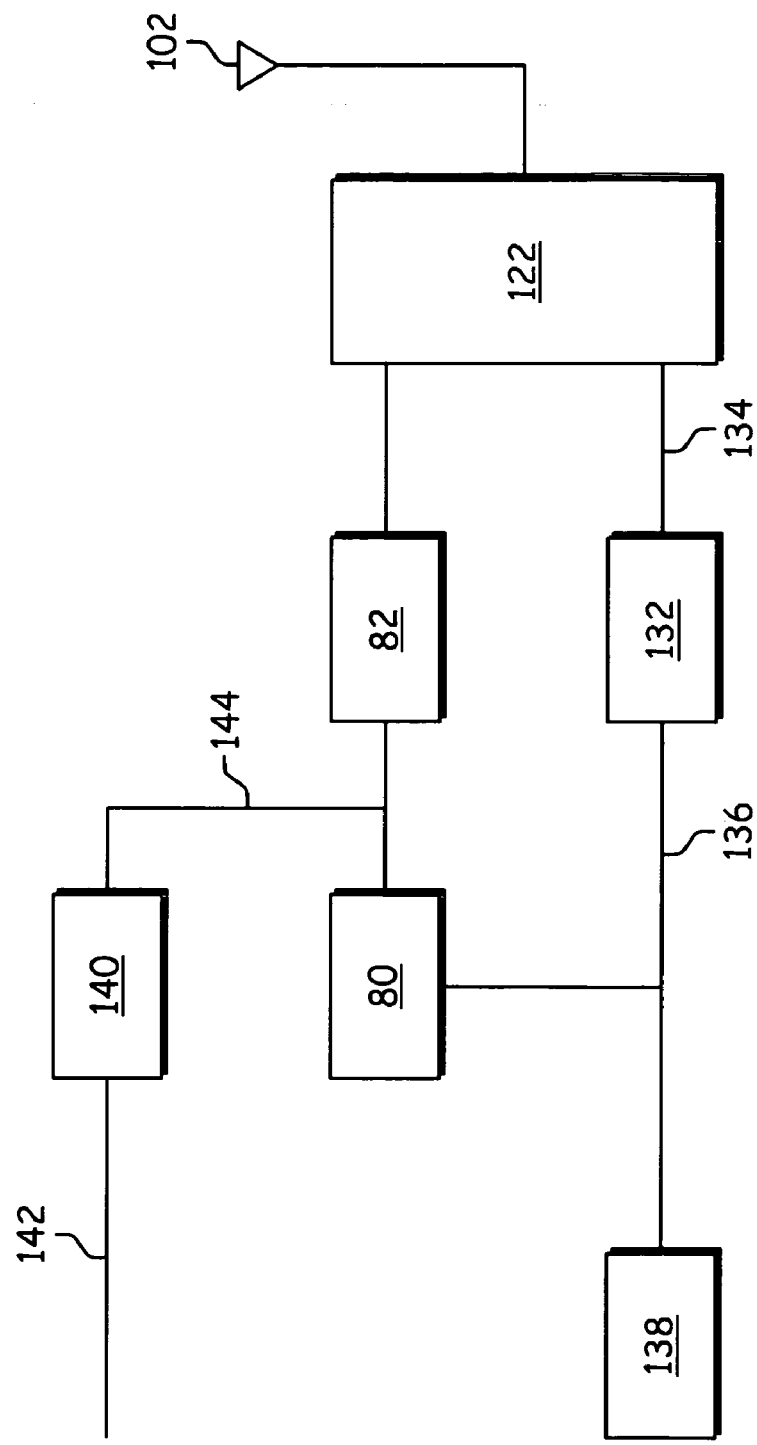
FIG. 10 is a schematic block diagram of a wireless microphone in accordance with the present invention.

FIG. 10 is a schematic block diagram of microphone 14 that includes audio input module 80, transmitter module 82, transmit receive switch 122, antenna 102, receiver module 132, input module 140 and display module 138. Input module 140 is operable to receive user input commands 142 and convert these commands into digital command messages 144. Input module 140 couples to or includes a user interface that allows a user to initiate enhanced call functions or network hardware operations. These enhanced call functions include call initiation operations, call conferencing operations, call forwarding operations, call hold operations, call muting operations, and call waiting operations. Additionally, the user may access network interface functions, base unit interface functions, directory functions, caller ID functions, voice activated commands and device programming functions. This user interface can be any combinations of visual interface(s), tactile interface(s), and/or an audio interface(s) that allow the user to input commands 142. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 132 via antenna 102. Display module 138, which may be a LCD display, plasma display, etc., receives digital command messages 136 and may display corresponding configuration messages. In addition, any display information received from the host and/or microphone module regarding setup, operation, or as part of the data content, may be displayed on display module 138.

Figure 11:
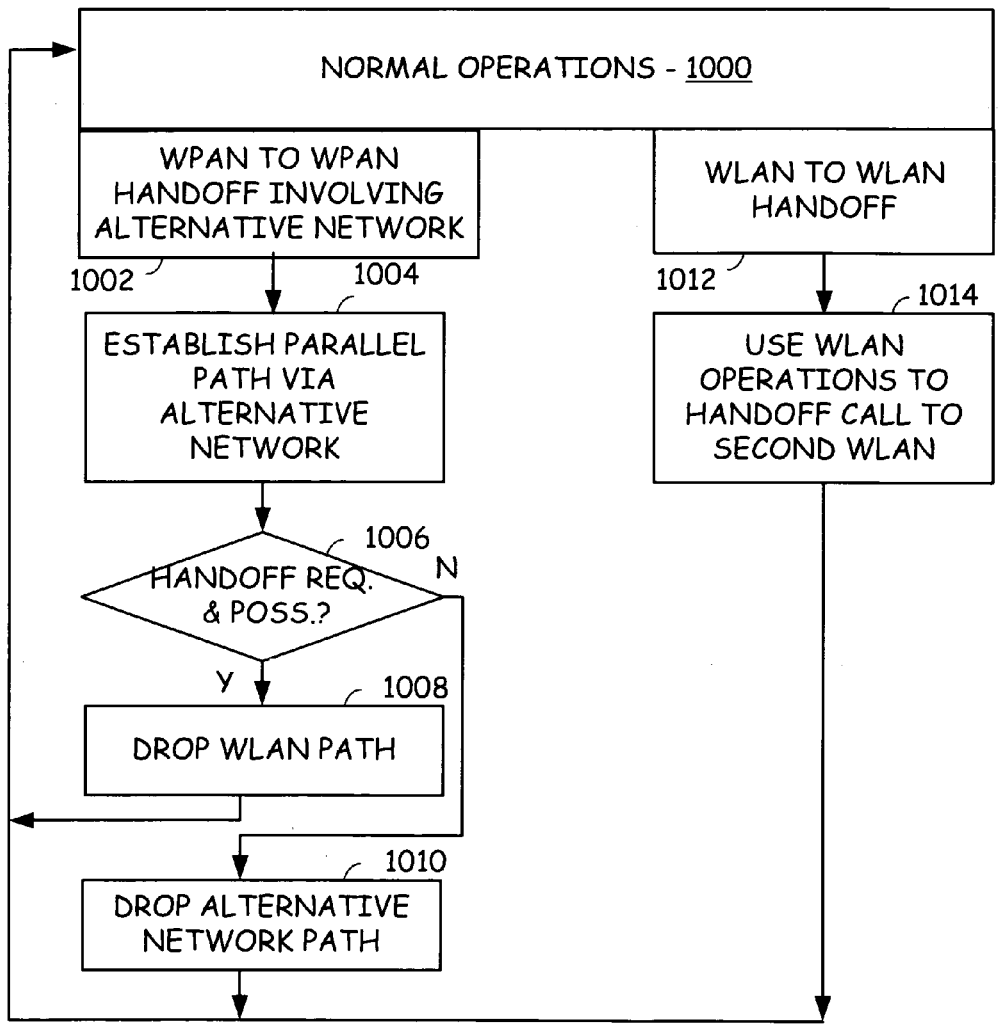
FIG. 11 is a logic diagram illustrating operation of a wireless device to service multiple audio communications according to an embodiment of the present invention.
Figure 12:
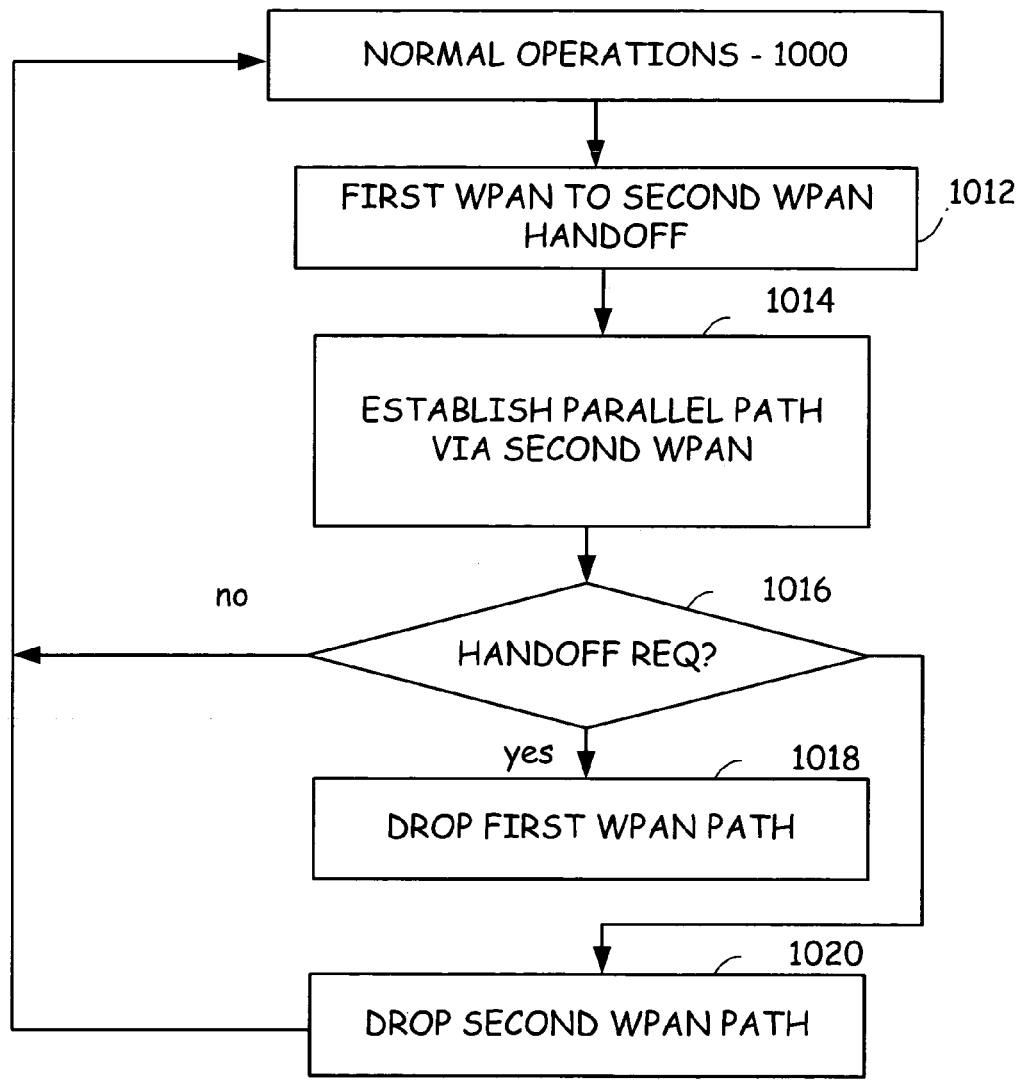
FIG. 12 is a logic diagram illustrating operation of a wireless device to handover of calls or audio communications serviced by wireless headsets between servicing base station (s) according to an embodiment of the present invention.

FIG. 11 is a logic diagram illustrating operation of a wireless headset constructed according to the present invention in managing call hand offs. The operations described with reference to FIG. 11 may be performed whole or in part by an on-chip processor within or coupled to processing modules 58 and 100 of FIGS. 7 and 8. During normal operations, the wireless headset services normal operations, e.g., single call or device playback. Other modular devices, such as those of FIG. 2 that couple to the microphone or headset, may perform these operations FIG. 11 depicts one method by which communication services are handed off. Normal call servicing (servicing of any audio communication) does not require a handoff (step 1000). However, when a handoff may be required, the system determines the required type of handoff At step 1002, the handoff required involves using an alternative servicing network. Step 1012 does not require an alternative servicing network. When a handoff may be required, a parallel communication path is established at step 1004. Then, a determination is made as to whether the handoff is actually possible and required by monitoring the communication quality between the wireless device and the WPAN at step 1006. The communication quality may be measured by considering the received signal strength at a servicing host device, the wireless terminal, by measuring the bit error rate at either the host device or the wireless terminal, or other method known to those skilled in the art. The determination may also be based on the location of the wireless terminal relative to the boundaries of the various WPAN coverage areas. If handoff is required (as determined at step 1006), one of the parallel paths is dropped and servicing continues via the remaining pathways. If handoff is not required (as determined at step 1006 by comparing signal quality to predetermined threshold levels) due to an increase in the communication quality of the servicing WPAN, the new communication path is dropped at step 1010. From each of steps 1008 and 1010, operation proceeds to step 1000.

The branch followed under steps 1002 specifically relate to handoff between the WPAN and an alternative network to service normal operations. The branch under 1012 specifically addresses when there is a handoff between WPAN post devices. Step 1014 uses WPAN operations to handoff the call as necessary to a second WPAN. One possibility for this procedure is discussed further in FIG. 12. At step 1012, the need for a first WPAN to second WPAN handoff is made. Parallel pathways are established via the second WPAN in step 1014 of FIG. 12. At decision point 1016, a determination is made as to whether or not a handoff is required. Should no handoff be required, normal operations continue returning to step 1000. Alternatively, if the handoff is required, communications are serviced by the second communication pathway and the first communication pathway is terminated in step 1018. Should the second communication pathway not be required in step 1020, this pathway is also terminated so that normal operations continue only utilizing a single pathway.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a modular communication device, modular wireless multimedia device and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. A method to service audio communications between a destination terminal accessible by a servicing network, and a wireless headset, comprising:
    establishing a first wireless personal area network (WPAN) between a first base unit and the wireless headset with a trusted relationship;
    operably coupling the first WPAN to the servicing network using the first base unit;
    servicing calls with a first communication pathway between the destination terminal, having an associated address, and the wireless headset via the operably coupled servicing network and first WPAN that are coupled together using the first base unit;
    detecting the presence of a second base unit;
    establishing a second WPAN, wherein the second WPAN operably couples the second base unit and the wireless headset;
    operably coupling the second WPAN to the servicing network using the second base unit, wherein the coupling comprises a trusted relationship;
    based on the address associated with the destination terminal, establishing a second communication pathway between the destination terminal and the wireless headset via the operably coupled servicing network and second WPAN that are coupled together using the second base unit;
    initiating, with the wireless headset, a handoff of the calls from the first communication pathway to the second communication pathway;
    servicing the calls with the second communication pathway; and
    terminating the first communication pathway.

2. The method of claim 1, wherein the wireless headset is operable to validate the identity of the first base unit and the second base unit using a subscriber or system identification module (SIM) when establishing a voice communication.

3. The method of claim 2, wherein the SIM of the wireless headset acts as a surrogate SIM for the first base unit when initiating a call via the first base unit.

4. The method of claim 3, wherein the SIM of the wireless headset acts as a surrogate SIM for the first base unit when servicing a call via the first base unit and/or second base unit.

5. The method of claim 2, wherein servicing the voice communications with the second communication pathway further comprises terminating the first communication pathway.

6. The method of claim 2, wherein initiating the handoff is based on user input.

7. The method of claim 2, further comprising alerting a user upon detecting the presence of a second base unit.

8. The method of claim 1, wherein the servicing network servicing network is selected from the group consisting of:
    cellular network;
    public switched telephone network (PSTN);
    wide area network (WAN);
    local area network (LAN); and
    a wireless local area network (WLAN).

9. The method of claim 8, wherein the serving network operably coupled to the first base unit and second base unit are different serving networks.

10. The method of claim 1, further comprising initiating advanced call functions with a user interface operably coupled to the wireless headset, wherein the advanced call functions comprise at least one function selected from the group consisting of:
    network interface functions;
    base unit interface functions;
    directory functions;
    caller ID functions;
    voice activated commands;
    call waiting functions;
    call conferencing functions;
    call initiation functions; and
    device programming functions.

11. The method of claim 10, wherein the at least one user interface comprises a visual interface, tactile interface, and/or audio interface.

12. The method of claim 11, wherein the tactile interface comprises one-touch buttons operable to initiate the advanced call functions.

13. The method of claim 11, wherein the audio interface further comprises a voice recognition system (VRS) operable to recognize voice commands.

14. The method of claim 13, further comprising identifying and implementing voice activated commands while servicing voice communications.

15. The method of claim 1, wherein:
    the first base unit is a cellular telephone that couples to the first WPAN to the servicing network; and
    the second base unit is a wire line telephone that couples to the second WPAN to the servicing network.

16. A wireless headset operable to service a call transferred from a first base unit to a second base unit, the wireless headset comprising:
- at least one wireless interface operable to wirelessly couple the wireless headset and the first base unit and/or the second base unit via a wireless personal area network (WPAN);
- a earpiece communicatively coupled to the at least one wireless interface, wherein the earpiece renders an inbound portion of the call audible;
- a microphone communicatively coupled to the at least one wireless interface, wherein the microphone is operable to produce an outbound portion of the call;
- a processing module communicatively coupled to the at least one wireless interface, wherein the processing module is operable to:
  - initiate a handover of the serviced call, having an associated address, from a first communication pathway serviced from a service network via the first base unit to a second communication pathway serviced from the service network via the second base unit, wherein the second communication pathway is established based on the address associated with the serviced call;
  - initiate call control functions between the wireless headset and the servicing network operably coupled to the second base unit;
  - service the call between the wireless headset and the servicing network that couples to the second base unit; and
  - anchor the call to the wireless headset; and
- a user interface communicatively coupled to the processing module, wherein the processing module is operable to initiate commands and/or call control functions based upon user input.

17. The wireless headset of claim 16, wherein the first base unit and second base unit are selected from the group consisting of:
- cellular network terminal;
- public switched telephone network (PSTN) terminal;
- wide area network (WAN) terminal;
- local area network (LAN) terminal; and
- a wireless local area network (WLAN) terminal.

18. The wireless headset of claim 16, wherein the first base unit or second base unit is operable to couple the wireless headset to a servicing network selected from the group consisting of:
- cellular network;
- public switched telephone network (PSTN);
- wide area network (WAN);
- local area network (LAN); and
- a wireless local area network (WLAN).

19. The wireless headset of claim 18, wherein the first base unit and second base unit operably couple to different servicing networks.

20. The wireless headset of claim 16, further comprising a user interface operably coupled to the earpiece and/or microphone that is operable to initiate commands based upon user input.

21. The wireless headset of claim 20, wherein the user interface comprises a visual interface, tactile interface, and/or audio interface.

22. The wireless headset of claim 21, wherein the user interface supports advanced call functions that comprise at least one function selected from the group consisting of:
- network interface functions;
- base unit interface functions;
- directory functions;
- caller ID functions;
- voice activated commands;
- call waiting functions;
- call conferencing functions;
- call initiation functions; and
- device programming functions.

23. The wireless headset of claim 22, wherein the tactile interface comprises one-touch buttons operable to initiate the advanced call functions.

24. The wireless headset of claim 22, wherein the audio interface further comprises a voice recognition system (VRS) operable to recognize voice commands operable to initiate the advanced call functions.

25. The wireless headset of claim 16, wherein the processing module is operable to validate the identity of at least one of the first base unit and the second base unit using a subscriber or system identification module (SIM) when establishing and/or servicing voice communications.

26. The wireless headset of claim 25, wherein the SIM of the wireless headset acts as a surrogate SIM for the first base unit when initiating a call via the first base unit.

27. The wireless headset of claim 26, wherein the SIM of the wireless headset acts as a surrogate SIM for the first base unit when servicing a call via the first base unit.

28. The wireless headset of claim 16, wherein:
- the first base unit is a cellular telephone that couples to the WPAN to the servicing network; and
- the second base unit is a wire line telephone that couples to the WPAN to the servicing network.

29. A method to service calls between a destination terminal accessible by a servicing network, and a wireless headset, the method comprising:
- establishing a first wireless personal area network (WPAN), wherein the first WPAN operably couples a first base unit and the wireless headset, wherein:
  - the wireless headset supports all of a WPAN protocol stack and a plurality of upper layers of the servicing network protocol stack; and
  - the first base unit supports a plurality of lower layers of the servicing network protocol stack;
- operably coupling the first WPAN to the servicing network using the first base unit;
- servicing calls with a first communication pathway between the destination terminal, having an associated address, and the wireless headset via the operably coupled servicing network and first WPAN that are coupled together using the first base unit, wherein a subscriber or system identification module (SIM) within the wireless headset is operable to support SIM functions for the first base portion;
- detecting the presence of a second base unit, wherein the second base unit is operable to support the plurality of lower layers of the servicing network protocol stack;
- establishing a second WPAN, wherein the second WPAN operably couples the second base unit and the wireless headset;
- operably coupling the second WPAN to the servicing network using the second base unit;
- based on the address associated with the destination terminal, establishing a second communication pathway between the destination terminal and the wireless headset via the operably coupled servicing network and second WPAN that are coupled together using the second base unit; and
- initiating, with the wireless headset, a handoff of the calls from the first communication pathway to the second communication pathway;

servicing the calls with the second communication pathway; and terminating the first communication pathway.

30. The method of claim 29, wherein the first servicing network and second servicing network are selected from the group consisting of:
cellular network;
public switched telephone network (PSTN);
wide area network (WAN);
local area network (LAN); and
a wireless local area network (WLAN).

31. The method of claim 29, wherein the first servicing network and second servicing network comprise different servicing networks.

32. The method of claim 29, wherein:
the headset is operable to process a first portion of a first network protocol stack or second network protocol stack;
the first base unit further comprises a first serving network interface operable to couple with the first serving network, and process a second portion of the first network protocol stack; and
the second base unit further comprises a second serving network interface operable to couple with the second serving network, and process a second portion of the second network protocol stack.

33. The method of claim 29, further comprising supporting subscriber identification module (SIM) functionality within the wireless headset.

34. The method of claim 29, further comprising initiating advanced call functions with a user interface operably coupled to the wireless headset.

35. The method of claim 34, wherein the advanced call functions comprise at least one function selected from the group consisting of:
network interface functions;
base unit interface functions;
directory functions;
caller ID functions;
voice activated commands;
call waiting functions;
call conferencing functions;
call initiation functions; and
device programming functions.

36. The method of claim 34, wherein the at least one user interface comprises a visual interface, tactile interface, and/or audio interface.

37. The method of claim 29, wherein:
the first base unit is a cellular telephone that couples to the first WPAN to the servicing network; and
the second base unit is a wire line telephone that couples to the second WPAN to the servicing network.

* * * * *